US008082385B2

(12) United States Patent
Wong

(10) Patent No.: US 8,082,385 B2
(45) Date of Patent: Dec. 20, 2011

(54) SYSTEMATIC MEMORY SHIFT FOR PRE-SEGMENTED MEMORY

(75) Inventor: Ling Jun Wong, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 740 days.

(21) Appl. No.: 12/151,095

(22) Filed: May 2, 2008

(65) Prior Publication Data
US 2009/0276564 A1  Nov. 5, 2009

(51) Int. Cl.
*G06F 12/00* (2006.01)
(52) U.S. Cl. ................................. 711/103; 711/E12.008
(58) Field of Classification Search .................. None
See application file for complete search history.

(56) References Cited

U.S. PATENT DOCUMENTS

| | | |
|---|---|---|
| 6,483,901 B1 | 11/2002 | Cuallo |
| 6,571,205 B1 | 5/2003 | Doucet et al. |
| 6,804,636 B2 | 10/2004 | Senta et al. |
| 7,139,863 B1 | 11/2006 | Defouw et al. |
| 7,143,155 B1 | 11/2006 | Reed et al. |
| 7,146,437 B2 | 12/2006 | Robbin et al. |
| 7,599,972 B2 | 10/2009 | Dodge et al. |
| 2002/0033890 A1 | 3/2002 | Nicklos et al. |
| 2003/0014333 A1 | 1/2003 | Brown |

(Continued)

FOREIGN PATENT DOCUMENTS
WO   WO 2005/031555   4/2005

OTHER PUBLICATIONS

"Maximizing Performance and Reliability in Flash Memory Devices," Randy Martin, QNX Software Systems, ECNMag.com, Mar. 1, 2006.

(Continued)

*Primary Examiner* — Pierre-Michel Bataille
*Assistant Examiner* — John P Fishburn
(74) *Attorney, Agent, or Firm* — Miller Patent Services; Jerry A. Miller

(57) ABSTRACT

A method of extending the life of a segmented memory device, consistent with certain embodiments involves providing a segmented memory device having a plurality of user defined segments with each segment having a starting and an ending address, and wherein the size and number of the segments is user defined; determining that a threshold number of write operations has been reached by reference to a write counter; copying data from a specified one of the segments to a temporary storage location; shifting the starting and ending address of each segment by a specified address increment; moving data stored in each segment except the specified segment by the specified address increment such that all data in the memory device has been shifted by the specified increment except for the data in the specified one of the segments, wherein data at a last segment is fragmented to wrap from an end of the memory device's addressable locations to a beginning of the memory device's addressable locations; copying the data from the specified one of the segments from the temporary storage location to a location shifted by the shift increment; and redefining the segments so that the user definitions remain applicable to the size and number of segments defined by the user, but with the addresses shifted by the specified increment. This abstract is not to be considered limiting, since other embodiments may deviate from the features described in this abstract.

27 Claims, 4 Drawing Sheets

U.S. PATENT DOCUMENTS

| | | |
|---|---|---|
| 2003/0026130 A1* | 2/2003 | Fasoli .................. 365/185.11 |
| 2003/0227804 A1 | 12/2003 | Lofgren et al. |
| 2004/0010668 A1* | 1/2004 | Inagaki et al. ............. 711/162 |
| 2004/0083335 A1* | 4/2004 | Gonzalez et al. ........... 711/103 |
| 2004/0088280 A1 | 5/2004 | Koh et al. |
| 2005/0055495 A1* | 3/2005 | Vihmalo et al. ............ 711/103 |
| 2006/0106972 A1* | 5/2006 | Gorobets et al. ........... 711/103 |
| 2006/0171683 A1 | 8/2006 | Battaglia et al. |
| 2006/0279643 A1 | 12/2006 | Levien et al. |
| 2007/0065119 A1 | 3/2007 | Pomerantz |
| 2007/0294490 A1 | 12/2007 | Freitas et al. |
| 2008/0010398 A1 | 1/2008 | Jiang |
| 2008/0109566 A1 | 5/2008 | Hitt et al. |
| 2008/0126574 A1 | 5/2008 | Matton et al. |
| 2008/0232769 A1 | 9/2008 | Jureczki et al. |

OTHER PUBLICATIONS

"Sandisk Flash Memory Cards, Wear Leveling," White Paper, Sandisk Corporation, Oct. 2003.
"Eye-Fi Card, Wireless 2 GB SD Memory Card," Amazon.com, Oct. 30, 2007.
"Exilim Zoom," Casio Exilim, Aug. 27, 2003.
"Sony HDPS-M1 40GB Portable Photo Storage," Sony, May 25, 2004.
Anonymous, "XS Drive 2 Smart 2300 Features," XS Drive Website, printed Mar. 26, 2008.
Anonymous, "Apacer Image Tank G2," Photography Review, May 1, 2006.
Anonymous, "Media Buddy: Portable Picture Storage with Card Reader," Digital Foci, 2006.

* cited by examiner

SYSTEMATIC MEMORY SHIFT FOR PRE-SEGMENTED MEMORY

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Each read/write cycle carried out in a flash memory damages the flash memory slightly. Therefore, if a segment of the memory is constantly being read or written, that part of the memory is subject to failure while the other parts of the memory are still in good condition. This can shortchange the lifetime of the flash memory, and therefore compromise the durability of the memory. Similar phenomenon can occur with other types of memory. Other types of memory may also be subject to similar damage with each read and/or write cycle.

Dynamic memory allocation is widely used in computers to store data in part because such methods maximize the life of the flash memory. However, dynamic memory allocation can complicate the functionality of some devices and is therefore not used for pre-segmented memory.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
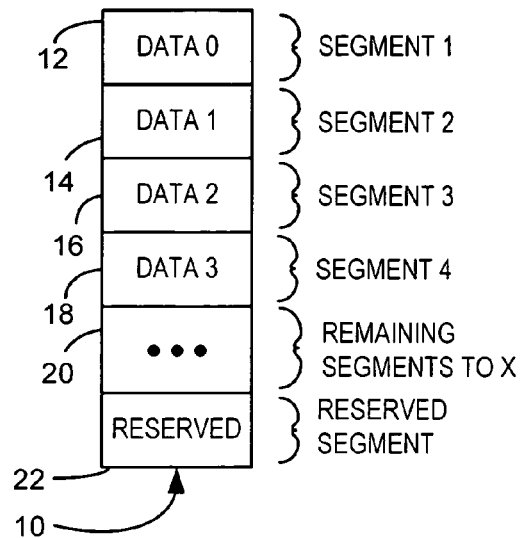
FIG. 1 is a diagram of an example pre-segmented memory device such as a flash memory consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Segmented memory, and in particular segmented flash memory, can be useful in a variety of applications. Such applications include compartmentalizing data storage by data type (e.g., data, movies, pictures, music, etc.). When flash memory is used as segmented memory, the memory can either be pre-segmented by the manufacturer, or more preferably, segmented by the user. When segmented by the user, the segmentation can involve assignment of segments having differing sizes, so that for example, a 1, GB flash memory could be segmented into three segments with a first having 100, MB for data, a second having 300, MB for pictures and a third having 600, MB for videos, by way of illustrative example.

As noted above, each read/write cycle carried out in a flash memory damages the flash memory slightly. Therefore, if a segment of the memory is constantly being read or written, that part of the memory is subject to failure while the other parts of the memory are still in good condition. This can shortchange the lifetime or reliability of the flash memory, and therefore compromise the durability and acceptability of the memory. Similar phenomenon can occur with other types of memory. Imagine, for example, a memory device in which a segment of the memory is dedicated to a function in which repeated read write cycles are the norm such as a segment used to transfer files from one computer to another, wherein the data are repeatedly written and re-written. One example might be a portable flash memory used by someone to continually update a document or other file that is manually transferred between two computers, say from a work computer to a home computer and vice versa on a daily basis.

In this example, the beginning of the segment at issue might be continually taken through read/write or write/erase cycles, while other parts of the segment and indeed other parts of the memory device may remain relatively or absolutely static. In this case, when the first memory cells degrade to the point of being unusable, the entire memory device may be prematurely rendered useless.

It is noted that current NAND flash memory technologies are not typically damaged by reading, but other types of memory may be. Accordingly, the present teachings should be construed in terms of the type of cycle that induces wear in the memory be it a read, write or erase operation, without limitation.

In accord with certain embodiments consistent with the present invention, data are periodically shifted in memory so that the actual allocated memory for each segments. This feature performs a shift after a specified number of writes to the flash memory or whenever another event occurs such as plugging into a particular device. In preferred embodiments, each shift changes the memory address covered by a certain segment by a certain amount.

For example, if segment 1 is specified to contain 1, GB of data and is allocated the memory address of 0x10000000, to 0x50000000. Assuming that the specified shift is 0x10000000, segment 1 will then correspond to a new memory address range of 0x20000000, to 0x 60000000, and segment 2 will start from 0x60000000. Such a shift extends the life of the flash memory by writing to different parts of the flash memory even though the segment size and segment names, as determined by the user, stay the same. Therefore, while it appears to the user that nothing changes, in the actual memory system, the segment boundaries have shifted and the problem is ameliorated.

Hence, embodiments consistent with this invention shift allocated memory by a certain amount to maximize the flash memory's life. The user may have no knowledge that a memory shift has occurred because segment 1 of the memory still contains the specified capacity and the data previously stored in segment 1.

In order to better understand embodiments consistent with the present invention, consider the illustration of FIG. 1. In this embodiment, a flash memory device 10 is segmented into X identifiable segments. The segments are illustrated as segments 0-X designated 12, 14, 16, 18 and remaining segments through X are designated collectively as 20. To generalize, memory 10 is also designated as having a reserved area 22 that can be used for housekeeping or reserved functions. Note that the segments are preferably user defined and may vary in size.

In one embodiment, after a specified number of writes, which can be tracked using an entry in the reserved area 22, a computer, or other device that utilizes the flash memory device 10, or manually by the user, a fixed memory shift is carried out the next time the memory is connected to a personal computer (pc) or laptop computer (or any other device that is programmed to perform the memory shift, such as for example, a camera, telephone, mass storage device or any other device with an embedded processor that can be programmed to carry out the memory shift operations described herein). Moreover, the data shifting can be carried out during a charge cycle for a battery powered device or during an idle time in order to avoid disruption of normal operational functions. When this connection occurs, either with or without prompting of the user, a part of the data in memory will be moved to either the reserved space within the flash memory or to a directory on a connected pc, laptop or other compatible device. This is to create space for the memory shift. The rest of the data in the flash memory is now shifted by a fixed amount. Finally, the data that is initially moved will now be transferred back to its new space in the flash memory. New section boundaries are marked and recorded so that the new segmentation appears to the user to be unchanged, but the actual memory locations used for each segment is somewhat different.

This feature ensures even usage distribution throughout the flash memory. This is especially important because after specifying sections for certain uses (like section 1 for pictures, section 2 for videos), users are likely to tend to stick to those sections for prolonged durations (assuming there is no reason for users to adjust sections if the use for the section remains the same). This causes overuse of memory for particular sections and under-use of memory in other sections, leading to premature breakdown of equipment.

Figure 2:
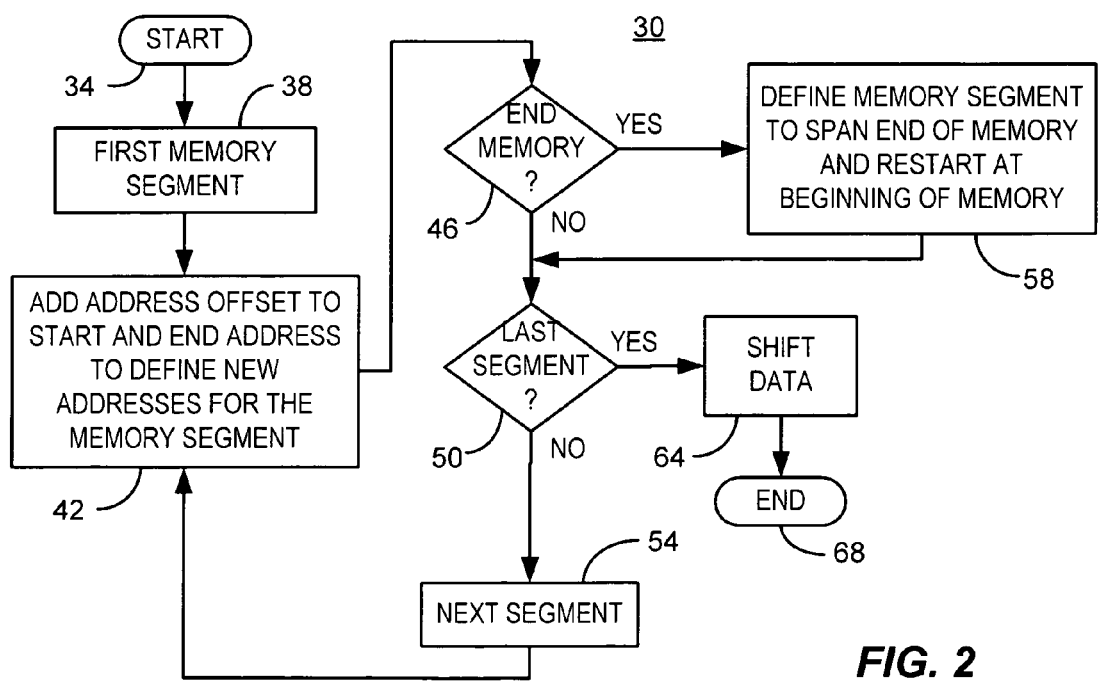
FIG. 2 is a flow chart depicting an exemplary process for shifting segments of a pre-segmented memory device in a manner consistent with certain embodiments of the present invention.

One exemplary process used to shift the memory segmentation is depicted in FIG. 2 as process 30 starting at 34. In this embodiment, the segment boundaries are first computed and then the data shifting is carried out, but those skilled in the art will appreciate that the ordering of the process can be manipulated such that the data are transferred from segment to segment (including transfer to an external memory as needed, as the segments are defined without departing from embodiments consistent with the present invention). At 38 the process starts with a first memory segment. Note again that the segments are preferably user defined and may vary in size. An offset is added at 42 to the current start and end address of the current segment. If the end of the memory is not reached at 46, and the last segment has not been reached at 50, then the process increments to the next segment at 54 and returns to 42 where the offset is again applied to the start and end address of the current segment.

When the end of the memory is reached (or the end of the memory prior to any reserved area or other unmovable data) at 58, the last segment is redefined to start at the next available address near the end of the memory and then continue to the beginning of the memory, thus fragmenting one segment, but allocating its full memory allocation along the way to span from near the end to near the beginning in a circular fashion. Here, the start of the segment is defined by adding the increment to the start address, and the memory segment is allocated until the end of the memory is reached. The remainder is allocated at the beginning of the memory and should end at the address just prior to the first contiguously allocated segment. Control then passes to 50 where the last segment will have been defined (assuming the process starts with the first contiguous segment allocation at 38). At this point, all of the new address locations have been defined and the data is shifted at 64 from its old defined segment location to the newly defined segment start and end points. The process ends at 68. The shifting of the data at 64 is carried out by shifting data from one segment into temporary storage to free up working space to move the data to its new location.

The next time the process is carried out, it can again start with the first segment, but note that the first segment will not be at the beginning of the memory. Hence, as the process is repeated, the location of each memory segment is shifted. Hence, one may wish to view the process as starting at first memory segment at 38, where the first segment in this case is the first fully contiguous memory segment. However, many variants of the process are possible to account for the fragmentation of the one final segment of memory locations spanning to the first of the memory locations.

Figure 3:
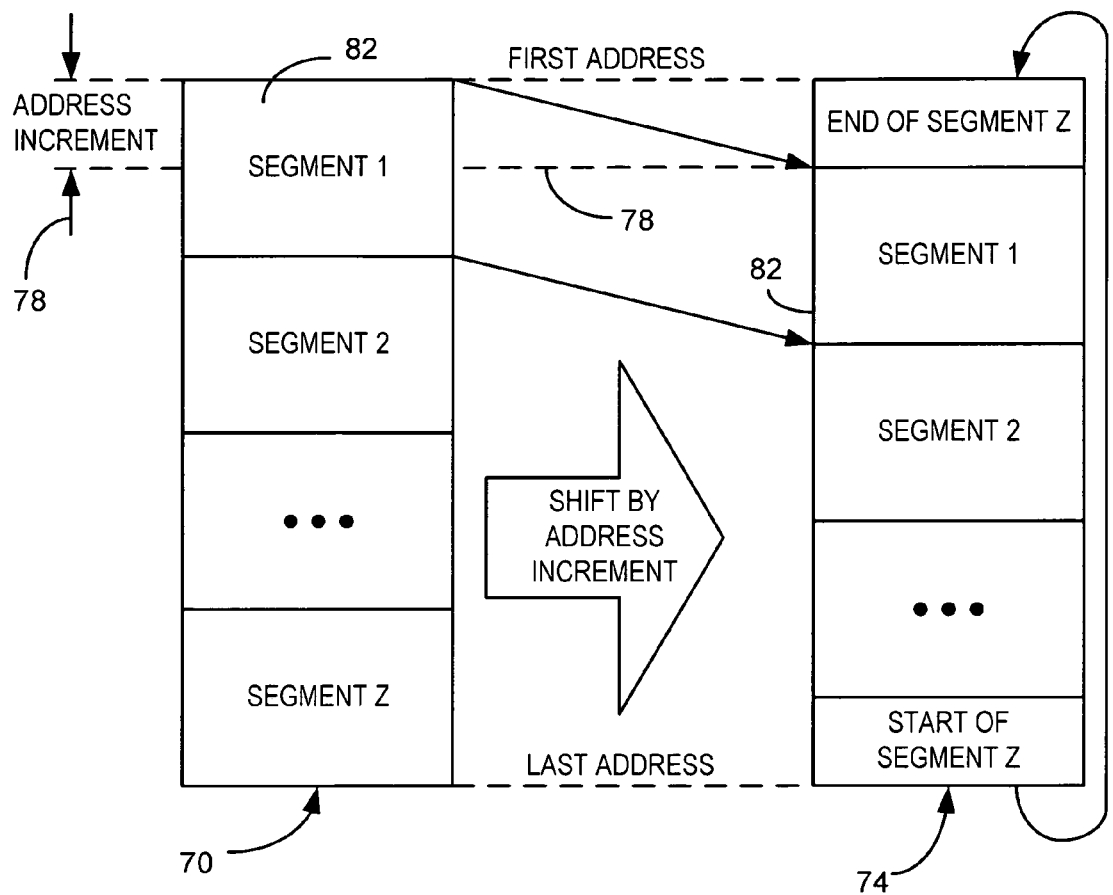
FIG. 3 is an illustration of before and after sifting data in a segmented memory in a manner consistent with certain embodiments of the present invention.

FIG. 3 illustrates an exemplary shift pattern for data from the old segments 70 defined on the left as segment 1 through segment Z to new segment locations 74 defined on the right. The address increment is depicted for the first segment as 78. The first segment 82 is shifted by the address increment 78 as shown. The last segment Z is also shifted by the address increment, but is fragmented from the end of the memory to the beginning as shown.

Figure 4A:
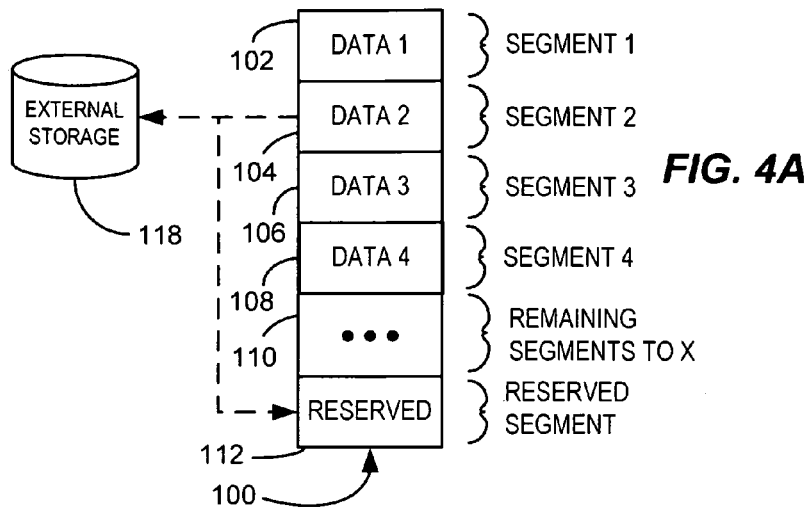
FIG. 4 which is made up of FIGS. 4A, 4B and 4C are illustrative of a data shifting process consistent with certain embodiments of the present invention.
Figure 4B:
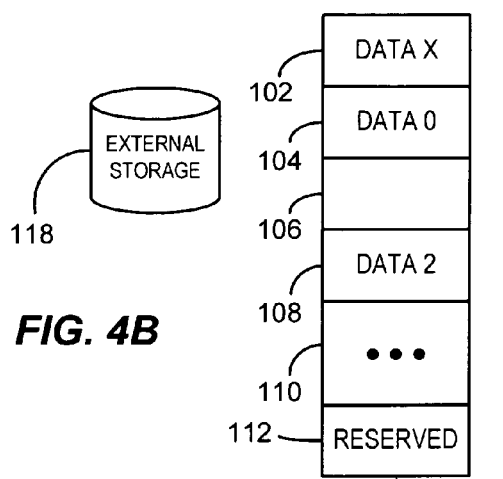
Figure 4C:
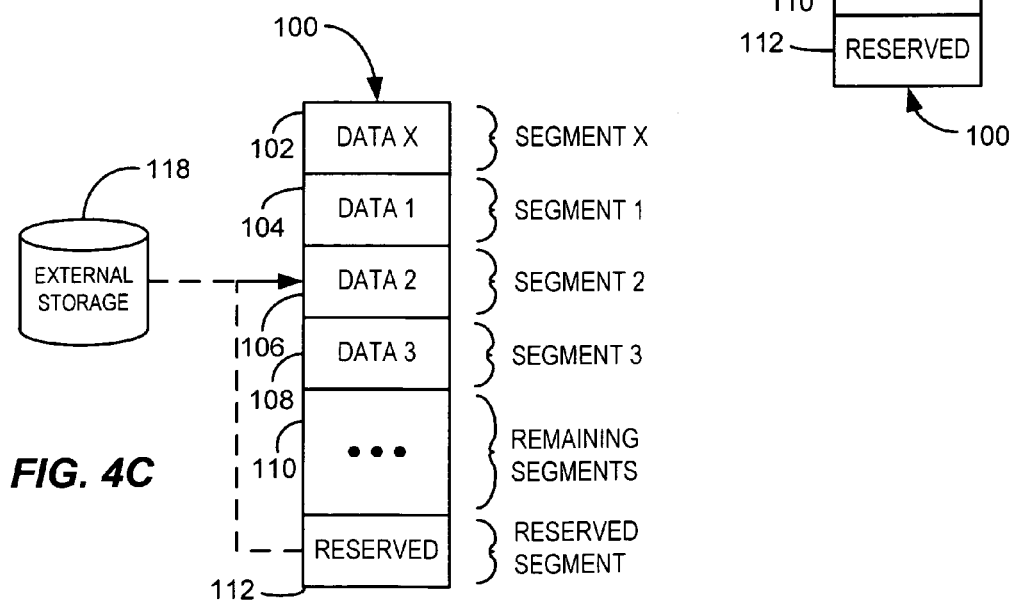

To further illustrate the data transfer process, reference is made to FIG. 4 which is made up of FIGS. 4A, 4B and 4C. For ease of illustration, the example of FIG. 4 ignores the issue of variable data segment size and assumes constant size, with the shift increment being defined as a segment size. Note carefully that this example is presented for ease of illustration of certain principles and, while such a shift will likely result in improved memory life, uniform segment sizes with an equal memory shift size is far from optimum. Better techniques will be described later.

In FIG. 4A, memory 100 includes data segments 1-X shown stored in memory locations designated 102, 104, 106, 108 and segments 5-X shown stored at 110. A reserved area of memory that has a fixed location is shown as 112. When the shifting process begins, segment 2 in this illustration is shifted to either an external storage device (PC, laptop, storage accessory, etc.) 118, or else a reserved segment of the memory device 100 forming a part of 112. Thus the data shown as DATA 1 is moved out of the memory's defined segments 1-X that are to be shifted to make room for the shift. At this point, the data of segment 1 (DATA 0) 102 can be shifted to position 104, and the data from the last segment X (DATA X) can be shifted to position 102.

The remaining data segments DATA 3 through DATA X can now be shifted forward to a new location. Position 106 is now available as depicted in FIG. 4B to receive DATA 2 from the temporary storage in external storage 118 or reserved area 112. In FIG. 4C, the data are shifted back from external storage 118 or reserved section 112 to area 106 thus completing the shift. Note that the segment labels are also shifted in FIG. 4C to indicate that the user will continue to address the memory segments in the same manner as prior to the shift. In this illustration, the use of temporary storage is depicted which can be used for storage of as little as a small portion of the memory 100 in order to allow for movement of the data, or in other embodiments can be used to completely copy the memory 100 so that the segments can be reallocated, then the data can be copied back to their same segments. Any variant thereof can be envisioned in light of the teachings presented herein.

Many algorithms can be devised to determine the address increment value including, but not limited to the following guidelines.

It is advantageous that the memory be configured in a manner such that the start of each segment is not reused as the start of another segment where possible, since the start of the segment is often most used and reused.

When there are multiple segment sizes, the smallest and largest segment sizes may be taken into consideration. So, for example, the segment size may be determined to be some fraction or multiple of the smallest segment size, or some fraction of the largest segment size.

A somewhat smaller increment is generally preferable to a larger increment in order to enhance speed of the process.

The increment may be fixed without regard for the segment sizes.

The increment may vary with each instance of the shifting process.

The increment may depend upon the amount of use of one or more of the segments (e.g., the increment may be equal to the amount of data used in a particular segment. That is, if a segment has capacity of 100, MB and only 22 MB has been used, the shift can be made equivalent to approximately 22, MB worth of addresses. This, likely puts memory to use which has not yet been heavily utilized.)

The increment may be randomized or pseudorandomized but care should be exercised to assure that any seed used in the randomization algorithm is appropriately incremented so that a small repeating pattern is not generated.

The shift may remain linear such that segments remain in sequential order (circularly), or the shift can also incorporate shuffling of the order of the segments (e.g., such that segment 2 follows segment 7, which follows segment 1, etc.)

It is preferable that the shift increment not be a common divisor of all sizes of the memory segments, since this can ultimately result in at least one of the segments starting at a start location previously occupied by that segment or other segments. Hence, the examples above break this rule for ease of illustration. In the example given of advancing the address locations by 0x10000000, a more preferable advance might be 0x10000011 or 0x10001001, or some other advance that is less likely to produce overlapping segment starting locations. However, it is noted that memories are typically grouped into small blocks or pages and it may be preferable to have the shift correspond to an increment of the block or page size as the common denominator. Such block sizes are typically small compared to the size of each segment so as to minimize the adverse effects that are desired to be avoided. Hence, instead of incrementing by a small number of bytes, incrementing by a small number of blocks is desired. For example, if a block is 256 KB, this is quite small compared to tens of megabytes or gigabytes and is an acceptable increment. In general, perhaps a size of less than a small percent of the segment or memory size is a suitable size, e.g., a small common divisor (<10, percent).

The algorithm should produce a meaningful shuffling of the memory, so that a very small increment is not desirable.

The algorithm may track the number of writes to each segment and determine when to shift and how based upon the most active segment or segments so as to more evenly spread out the write and read operations.

The shift can also bounce or rotate within each segment. For example, the first half of a segment can swap with the second half, or can rotate or bounce in any fashion. Such shifting can be incorporated as a minor shift that is done along with the major shifting operations described herein.

Figure 5:
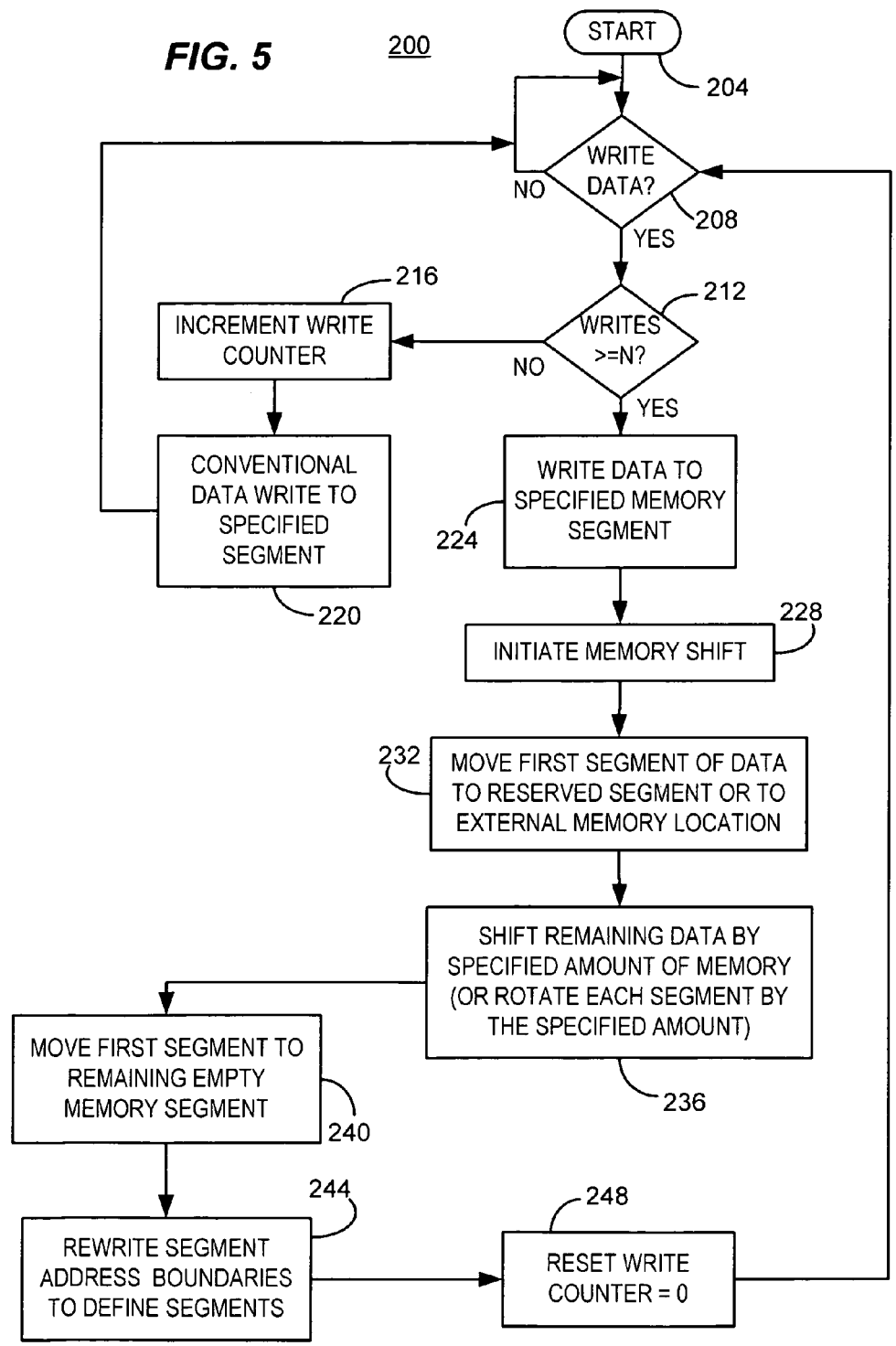
FIG. 5 is a flow chart of another exemplary process consistent with certain embodiments of the present invention.

Turning now to FIG. 5, another process 200 is depicted for shifting of memory in accord with embodiments consistent with the present invention starting at 204. In this process, the PC or other device connected to the flash memory determines if a write of data is to be carried out at 208. The number of writes since last data shift is examined at 212. If the number of writes has not reached or exceeded N, a write counter is incremented at 216 and the system proceeds at 220 with a normal data write action. Control then returns to 208.

When the number of writes meets or exceeds the threshold N, the data is written to the specified memory segment at 224 and the memory shift operation is initiated at 228. Initiation of this process may include requesting permission of the user to do so, in order to prevent disruption of work if the shift operation comes at an inconvenient time. If a shift is to take place, the first segment (or a segment) of data is shifted to an external or reserved internal location to make room for the shift at 232. The data are then shifted according to a specified shift amount determined by any suitable shift algorithm (including a fixed amount) at 236. This can include any of the details discussed above. Once all data are shifted except that which was stored to temporary external or internal storage at 236, the first segment is moved back to the memory to the remaining empty segment at 240. The segment address boundaries are then rewritten at 244 to redefine the segments and the write counter is reset at 248. Control then returns to 208 to await the next write cycle and shift cycle.

In other variations, the number of writes and reads may be tracked and used, or the amount of data written or read may be used as a metric to determine when a shift is to take place. Other variations will occur to those skilled in the art upon consideration of the present teachings.

Thus, a method of extending the life of a segmented memory device, involves providing a segmented memory device having a plurality of user defined segments with each segment having a starting and an ending address, and wherein the size and number of the segments is user defined; determining that a threshold number of write operations has been reached by reference to a write counter; copying data from a specified one of the segments to a temporary storage location; shifting the starting and ending address of each segment by a specified address increment; moving data stored in each segment except the specified segment by the specified address increment such that all data in the memory device has been shifted by the specified increment except for the data in the specified one of the segments, wherein data at a last segment is fragmented to wrap from an end of the memory device's addressable locations to a beginning of the memory device's addressable locations; copying the data from the specified one of the segments from the temporary storage location to a location shifted by the shift increment; and redefining the segments so that the user definitions remain applicable to the size and number of segments defined by the user, but with the addresses shifted by the specified increment.

In certain embodiments, the temporary storage location comprises a reserved segment of the segmented memory device. In certain embodiments, the temporary storage location comprises an external storage device external to the segmented memory device. In certain embodiments, each segment is user designated for storage of files of a specified type. In certain embodiments, the address increment is selected in a manner such that the start of each segment is not reused as the start of another segment after the shift has been executed. In certain embodiments, the address increment is determined to be a fraction or multiple of the smallest segment size. In certain embodiments, the address increment is determined to be a fraction of the largest segment size In certain embodiments, the address increment is fixed without regard for the segment sizes. In certain embodiments, the address increment varies with each instance of the process. In certain embodiments, the address increment is determined to be approximately the amount of data used in one of the segments. In certain embodiments, the address increment is determined to be the amount of data used in the largest segment. In certain embodiments, the address increment is randomized or pseudorandomized with any seed used in the randomization algorithm being incremented so that a repeating pattern of increment sizes is not generated. In certain embodiments, the segments are shifted in a circular sequence so as to always remain in sequential order. In certain embodiments, the process further involves shuffling the segments so that the order of the segment locations is changed In certain embodiments, the shift increment is a small common divisor of all sizes of the memory segments. In certain embodiments, the segmented memory comprises a flash memory. In certain embodiments, the process is carried out during a charge cycle for a battery powered device or during processor idle time in order to avoid disruption of normal operational functions. In certain embodiments, the process further comprising shifting a location of data within a specified segment prior or subsequent to the main process. A tangible computer readable storage medium can store instructions which, when executed on one or more programmed processors, carry out any of the above methods.

Another method of extending the life of a segmented flash memory device involves providing a segmented flash memory device having a plurality of user defined segments with each segment having a starting and an ending address, and wherein the size and number of the segments is user defined, and wherein each segment is user designated for storage of files of a specified type; determining that a threshold number of write operations has been reached by reference to a write counter; copying data from a specified one of the segments to a temporary storage location, wherein the temporary storage location comprises either a reserved segment of the segmented memory device or an external storage device external to the segmented memory device; shifting the starting and ending address of each segment by a specified address increment; moving data stored in each segment except the specified segment by the specified address increment such that all data in the memory device has been shifted by the specified increment except for the data in the specified one of the segments, wherein data at a last segment is fragmented to wrap from an end of the memory device's addressable locations to a beginning of the memory device's addressable locations, wherein the address increment is not a common divisor of all sizes of the memory segments; copying the data from the specified one of the segments from the temporary storage location to a location shifted by the shift increment; and redefining the segments so that the user definitions remain applicable to the size and number of segments defined by the user, but with the addresses shifted by the specified increment, and wherein the segments are shifted in a circular sequence so as to always remain in sequential order.

In certain embodiments, the address increment is selected in a manner such that the start of each segment is not reused as the start of another segment after the shift has been executed. In certain embodiments, the address increment is determined to be a fraction or multiple of the smallest segment size. In certain embodiments, the address increment is determined to be a fraction of the largest segment size. In certain embodiments, the address increment is fixed without regard for the segment sizes. In certain embodiments, the address increment varies with each instance of the process of claim 20. In certain embodiments, the address increment is determined to be approximately the amount of data used in one of the segments. In certain embodiments, the process is carried out during a charge cycle for a battery powered device or during processor idle time in order to avoid disruption of normal operational functions. A tangible computer readable storage medium can store instructions which, when executed on one or more programmed processors, carry out any of the above processes.

A segmented flash memory storage device consistent with certain embodiments has a flash memory device. The flash memory device has a plurality of user defined segments with each segment having a starting and an ending address, and wherein the size and number of the segments is user defined. The segments have been redefined by a process involving determining that a threshold number of write operations has been reached by reference to a write counter; copying data from a specified one of the segments to a temporary storage location; shifting the starting and ending address of each segment by a specified address increment; moving data stored in each segment except the specified segment by the specified address increment such that all data in the memory device has been shifted by the specified increment except for the data in the specified one of the segments, wherein data at a last segment is fragmented to wrap from an end of the memory device's addressable locations to a beginning of the memory device's addressable locations; copying the data from the specified one of the segments from the temporary storage location to a location shifted by the shift increment; and redefining the segments so that the user definitions remain applicable to the size and number of segments defined by the user, but with the addresses shifted by the specified increment.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of extending the life of a segmented memory device, comprising:
   providing a segmented memory device having a plurality of user defined segments with each user defined segment having a starting and an ending address, and wherein the size and number of the user defined segments is user defined;
   incrementing a write counter count whenever a write operation to the memory device takes place;
   comparing the write counter count to a threshold number to determine that the threshold number of write operations has been reached or exceeded;
   copying data from a specified one of the user defined segments to a temporary storage location, where the temporary storage location is a reserved segment of the segmented memory device;
   shifting the starting and ending address of each user defined segment by a specified address increment;
   moving data stored in each user defined segment except the specified user defined segment by the specified address increment such that all data in the memory device has been shifted by the specified increment except for the data in the specified one of the user defined segments, wherein data at a last user defined segment is fragmented to wrap from an end of the memory device's addressable locations to a beginning of the memory device's addressable locations;
   copying the data from the specified one of the segments from the temporary storage location to a location in the segmented memory device shifted by the shift increment; and
   redefining the user defined segments of the segmented memory device so that the user definitions of the segments remain applicable to the size and number of user defined segments defined by the user, but a starting and an ending address and all addresses intermediate to the starting and ending addresses of each user defined segment being shifted by the specified increment.

2. The method according to claim 1, wherein each user defined segment is user designated for storage of files of a specified type.

3. The method according to claim 1, wherein the address increment is selected in a manner such that the start of each user defined segment is not reused as the start of another user defined segment after the shift has been executed.

4. The method according to claim 1, wherein the address increment is determined to be a fraction or multiple of a smallest user defined segment size.

5. The method according to claim 1, wherein the address increment is determined to be a fraction of a largest segment size.

6. The method according to claim 1, wherein the address increment is fixed without regard for any user defined segment sizes.

7. The method according to claim 1, wherein the address increment varies with each instance of the process of claim 1.

8. The method according to claim 1, wherein the address increment is determined to be approximately the amount of data used in one of the user defined segments.

9. The method according to claim 8, wherein the address increment is determined to be an amount of data used in a largest user defined segment.

10. The method according to claim 1, wherein the address increment is randomized or pseudorandomized with any seed used in the randomization algorithm being incremented so that a repeating pattern of increment sizes is not generated.

11. The method according to claim 1, wherein the user defined segments are shifted in a circular sequence so as to always remain in sequential order.

12. The method according to claim 1, further comprising shuffling the user defined segments so that the order of the user defined segment locations is changed.

13. The method according to claim 1, wherein the shift increment is a small common divisor of all sizes of the user defined segments.

14. The method according to claim 1, wherein the user segmented memory comprises a flash memory.

15. The method according to claim 1, wherein the process is carried out during a charge cycle for a battery powered device or during processor idle time in order to avoid disruption of normal operational functions.

16. The method according to claim 1, further comprising shifting a location of data within a specified user defined segment prior or subsequent to the method according to claim 1.

17. A tangible computer readable storage medium storing instructions which, when executed on one or more programmed processors, carry out a method according to claim 1.

18. A method of extending the life of a segmented flash memory device, comprising:
provuiding a segmented flash memory device having a plurality of user defined segments with each user defined segment having a starting and an ending address, and wherein the size and number of the user defined segments is user defined, and wherein each user defined segment is user designated for storage of files of a specified type;
incrementing a write counter count whenever a write operation to the memory device takes place;
comparing the write counter count to a threshold number to determine that the threshold number of write operations has been reached or exceeded;
copying data from a specified one of the user defined segments to a temporary storage location, where the temporary storage location is a reserved segment of the segmented memory device;
shifting the starting and ending address of each user defined segment by a specified address increment;
moving data stored in each user defined segment except the user defined specified segment by the specified address increment such that all data in the memory device has been shifted by the specified increment except for the data in the specified one of the user defined segments, wherein data at a last user defined segment is fragmented to wrap from an end of the memory device's addressable locations to a beginning of the memory device's addressable locations, wherein the address increment is not a common divisor of all sizes of the memory segments;
copying the data from the specified one of the segments from the temporary storage location to a location in the segmented memory device shifted by the shift increment; and
redefining the user defined segments so that the user definitions remain applicable to the size and number of user defined segments defined by the user, but with a starting and an ending address and all addresses intermediate to the starting and ending addresses shifted by the specified increment, and wherein the user defined segments are shifted in a circular sequence so as to always remain in sequential order.

19. The method according to claim 18, wherein the address increment is selected in a manner such that the start of each user defined segment is not reused as the start of another user defined segment after the shift has been executed.

20. The method according to claim 18, wherein the address increment is determined to be a fraction or multiple of a smallest segment size.

21. The method according to claim 18, wherein the address increment is determined to be a fraction of a largest segment size.

22. The method according to claim 18, wherein the address increment is fixed without regard for the user defined segment sizes.

23. The method according to claim 18, wherein the address increment varies with each instance of the process of claim 18.

24. The method according to claim 18, wherein the address increment is determined to be approximately the amount of data used in one of the user defined segments.

25. The method according to claim 18, wherein the process is carried out during a charge cycle for a battery powered device or during processor idle time in order to avoid disruption of normal operational functions.

26. A tangible computer readable storage medium storing instructions which, when executed on one or more programmed processors, carry out a method according to claim 18.

27. A segmented flash memory storage device, comprising:
a flash memory device;
the flash memory device having a plurality of user defined segments with each user defined segment having a starting and an ending address, and wherein the size and number of the user defined segments is user defined;
wherein, the user defined segments have been redefined by a process comprising:
incrementing a write counter count whenever a write operation to the memory device takes place;
comparing the write counter count to a threshold number to determine that the threshold number of write operations has been reached or exceeded;
copying data from a specified one of the user defined segments to a temporary storage location, where the temporary storage location is a reserved segment of the segmented memory device;
shifting the starting and ending address of each user defined segment by a specified address increment;
moving data stored in each user defined segment except the specified user defined segment by the specified address increment such that all data in the memory device has been shifted by the specified increment except for the data in the specified one of the user defined segments, wherein data at a last user defined segment is fragmented to wrap from an end of the memory device's addressable locations to a beginning of the memory device's addressable locations;
copying the data from the specified one of the segments from the temporary storage location to a location in the user defined segmented memory device shifted by the shift increment; and
redefining the user defined segments so that the user definitions remain applicable to the size and number of user defined segments defined by the user, but with a starting and an ending address and all addresses intermediate to the starting and ending addresses shifted by the specified increment.

* * * * *